(12) United States Patent
Singh et al.

(10) Patent No.: US 11,829,231 B2
(45) Date of Patent: Nov. 28, 2023

(54) METHODS AND SYSTEMS FOR GENERATING CORE DUMP IN A USER EQUIPMENT

(71) Applicant: Samsung Electronics Co., Ltd., Suwon-si (KR)

(72) Inventors: Hartej Singh, Bangalore (IN); Mallikarjun Shivappa Bidari, Bangalore (IN); Raju Udava Siddappa, Bangalore (IN); Surajit Pradeep Karmakar, Bangalore (IN); Thejeswara Reddy Pocha, Bangalore (IN); Tushar Vrind, Bangalore (IN); Venkata Raju Indukuri, Bangalore (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/539,403

(22) Filed: Dec. 1, 2021

(65) Prior Publication Data

US 2022/0171671 A1    Jun. 2, 2022

(30) Foreign Application Priority Data

Dec. 1, 2020  (IN) .............................. 202041052295

(51) Int. Cl.
*G06F 11/00*    (2006.01)
*G06F 11/07*    (2006.01)
(Continued)

(52) U.S. Cl.
CPC ...... *G06F 11/0778* (2013.01); *G06F 11/0772* (2013.01); *G06F 11/1004* (2013.01);
(Continued)

(58) Field of Classification Search
None
See application file for complete search history.

(56) References Cited

U.S. PATENT DOCUMENTS 7,797,342 B2   9/2010   Banks et al.
9,026,860 B2   5/2015   Akirav et al.
(Continued)

FOREIGN PATENT DOCUMENTS

CN   110928720 A   3/2020
CN   107357731 B   9/2020

OTHER PUBLICATIONS

Microsoft Computer Dictionary, 4th Ed., Microsoft Press, p. 84. (Year: 1999).*

(Continued)

*Primary Examiner* — Christopher S McCarthy
(74) *Attorney, Agent, or Firm* — Harness, Dickey & Pierce, P.L.C.

(57) ABSTRACT

A method of generating a core dump in a User Equipment (UE) may include detecting, using at least one processor, a trigger, the trigger including an instruction to generate a core dump of the UE. The method may further include classifying, using the at least one processor, data stored in memory of the UE as Read-Write (RW) data or Read Only (RO) data. The method may further include generating, using the at least one processor, a partial core dump based on the RW data of the memory.

20 Claims, 8 Drawing Sheets

(51) Int. Cl.
  G06F 21/60  (2013.01)
  G06F 21/79  (2013.01)
  G06F 11/10  (2006.01)

(52) U.S. Cl.
  CPC ............ G06F 21/602 (2013.01); G06F 21/79 (2013.01); *G06F 2221/0751* (2013.01)

(56) References Cited

U.S. PATENT DOCUMENTS

| | | | |
|---|---|---|---|
| 10,516,533 B2 | 12/2019 | Mannan et al. | |
| 2009/0172409 A1* | 7/2009 | Bullis | G06F 21/554 714/38.11 |
| 2014/0298041 A1* | 10/2014 | Consalus | G06F 21/602 713/193 |
| 2015/0046754 A1* | 2/2015 | Nagahama | G06F 11/0778 714/38.11 |
| 2019/0172409 A1 | 6/2019 | Choi et al. | |
| 2020/0042729 A1 | 2/2020 | Feng et al. | |

OTHER PUBLICATIONS

Google Scholar/Patents search—text refined (Year: 2023).*
"About dump encryption-Microsoft Docs," Nov. 3, 2016, https://docs.microsoft.com/en-us/windows-server/virtualization/hyper-v/manage/about-dump-encryption, retrieved on Jul. 29, 2021.
Peterson, P., "Cryptkeeper: Improving security with encrypted RAM," IEEE Xplore, ResearchGate, Dec. 2010.
Golde, N. et al., "Breaking Band—reverse engineering and exploiting the Shannon baseband," Comsecuris, Sep. 2016.
Berard, D. et al., "How to design a baseband debugger," Synacktiv 2020.
Maier, D. et al., "BaseSAFE: Baseband SAnitized Fuzzing through Emulation," WiSec '20, Jul. 8-10, 2020, Linz (Virtual Event), Austria.
Gong, X., "Exploiting Qualcomm WLAN and Modem Over the Air" Aug. 2019.
Tencent Blade Team, "Exploring Qualcomm Baseband via ModKit" CanSecWest 2018.

* cited by examiner

METHODS AND SYSTEMS FOR GENERATING CORE DUMP IN A USER EQUIPMENT

CROSS-REFERENCE TO RELATED APPLICATION

This U.S. non-provisional application claims the benefit of priority under 35 USC § 119 to Indian Provisional Patent Application No. 202041052295, filed on Dec. 1, 2020, in the Office of the Controller General of Patents, Designs and Trade Marks (CGPDTM), the disclosure of which is incorporated by reference herein in its entirety.

BACKGROUND

Various example embodiments generally relate to a core dump, and particularly relates to methods, apparatuses, systems, and/or non-transitory computer readable media for generating a core dump in a User Equipment (UE).

Traditionally, the modem processor is responsible for providing wireless communication and connectivity in a smartphone, spanning a range of technologies. Increased digitalization has led to smartphone usage in confidentiality-critical communication needs such as—banking, one-time password-based authentications, sending/receiving confidential data, digital rights management (DRM), etc., most of which is exchanged over a network using the modem baseband. While this increases the demand and/or need for stronger security in digital communication, it also increases the risk of exposure of these critical security credentials to hackers through reverse engineering, snooping or malware attacks. Most documented cyberattacks are found to be carried out after gaining significant knowledge about the design and operations of a computer system and/or network system. A core dump is one such attack vector (e.g., cyber-attack vector) which may expose information which enables cyber intruders to discover vulnerabilities in the computer system and/or network system.

A core dump contains the current execution state of a computer system, code (e.g., program code, computer readable instructions, etc.) that is currently in use, static strings, and data residing in memory at a point of failure of the computer system. In the case of most embedded systems, all of the code resides in the memory at all times. There is no on-demand loading of code into memory. Hence, a core dump for such a system will contain all of the code stored in the memory. Most released consumer devices will have the option of collecting a core dump for debugging purposes. One option would be to not allow the capturing of the core dump on a consumer device. However, even after expansive testing before release, some issues might surface only after the device has reached the customer. In such cases, a core dump would still be desired and/or required to debug and fix the issue.

Easy access to core dumps drive modem baseband processor attacks. Reports indicate that most reverse engineering of cellular modems are performed by accessing contents of a core dump of the modem baseband processor. Access to core dumps eases the identification of software loopholes, security vulnerabilities, and/or bugs. Malicious programs injected by exploiting these loopholes help hackers take control of modem and/or extract confidential information, which the hackers otherwise may not be able to access.

There is a desire and/or need for a solution to overcome the above-mentioned drawbacks.

SUMMARY

This summary is provided to introduce a selection of concepts in a simplified format that are further described in the detailed description. This summary is not intended to identify key or essential inventive concepts of the claimed subject matter, nor is it intended for determining the scope of the claimed subject matter. In accordance with the purposes of the disclosure, the various example embodiments as embodied and broadly described herein, describes methods, apparatuses, systems and/or non-transitory computer readable media for generating a core dump in a UE.

In accordance with some example embodiments of the inventive concepts, a method of generating a core dump in a UE is disclosed. The method may include detecting, using at least one processor, a trigger, the trigger including an instruction to generate a core dump in the UE, classifying, using the at least one processor, data stored in memory of the UE as Read-Write (RW) data or Read Only (RO), and generating, using the at least one processor, a partial core dump based on the RW data of the memory.

In accordance with some example embodiments of the inventive concepts, a method of reconstructing a complete core dump is disclosed. The method may include receiving, using at least one processor, a trigger, the trigger including an instruction to generate a complete core dump of a user equipment (UE), fetching, using the at least one processor, read-only (RO) data from a desired partial core dump file, the desired partial core dump file being at least partially encrypted, writing, using the at least one processor, the RO data to an output file, fetching read-write (RW) data from the desired partial core dump file, and writing, using the at least one processor, the RW data to the output file to reconstruct the complete core dump.

In accordance with some example embodiments of the inventive concepts, a system for generating a core dump in a UE is disclosed. The system may include at least one processor configured to execute computer readable instructions to, detect a trigger, the trigger including an instruction to generate a core dump in the UE, classify data stored in memory of the UE as Read-Write (RW) data and Read Only (RO) data present in the memory of the UE, and generate a partial core dump based on the RW data of the memory of the UE.

In accordance with some example embodiments of the inventive concepts, a decryption device for reconstructing a complete core dump is disclosed. The decryption device may include at least one processor configured to execute computer readable instructions to, receive a trigger, the trigger including an instruction to generate a complete core dump of a user equipment (UE), fetch read-only (RO) data from a desired partial core dump file, the partial core dump file being at least partially encrypted, write the RO data to an output file, fetch read-write (RW) data from the desired partial core dump file, and write the RW data to the output file to reconstruct the complete core dump.

These aspects and advantages will be more clearly understood from the following detailed description taken in conjunction with the accompanying drawings and claims.

Further, skilled artisans will appreciate that elements in the drawings are illustrated for simplicity and may not have been necessarily been drawn to scale. For example, the flow charts illustrate the method in terms of the most prominent operations involved to help to improve understanding of aspects of at least one example embodiment of the inventive concepts. Furthermore, in terms of the construction of the device, one or more components of the device may have been represented in the drawings by conventional symbols, and the drawings may show only those specific details that are pertinent to understanding the example embodiments of the inventive concepts so as not to obscure the drawings with details that will be readily apparent to those of ordinary skill in the art having benefit of the description herein.

DETAILED DESCRIPTION

For the purpose of promoting an understanding of the principles of one or more of the example embodiments of the inventive concepts, reference will now be made to the embodiment illustrated in the drawings and specific language will be used to describe the same. It will nevertheless be understood that no limitation of the scope of the example embodiments are thereby intended, such alterations and further modifications in the illustrated system, and such further applications of the principles of the example embodiments as illustrated therein being contemplated as would normally occur to one skilled in the art to which the inventive concepts relate.

It will be understood by those skilled in the art that the foregoing general description and the following detailed description are explanatory of one or more of the example embodiments of the inventive concepts and are not intended to be restrictive thereof.

Reference throughout this specification to "an aspect", "another aspect" or similar language means that a particular feature, structure, or characteristic described in connection with the example embodiment is included in at least one example embodiment of the inventive concepts. Thus, appearances of the phrase "in at least one example embodiment", "in another example embodiment" and similar language throughout this specification may, but do not necessarily, all refer to the same example embodiment.

The terms "comprises", "comprising", or any other variations thereof, are intended to cover a non-exclusive inclusion, such that a process or method that comprises a list of operations does not include only those operations but may include other operations not expressly listed and/or inherent to such process and/or method. Similarly, one or more devices, sub-systems, elements, structures, and/or components, etc., proceeded by "comprises . . . a" does not, without more constraints, preclude the existence of other devices, other sub-systems, other elements, other structures, other components, additional devices, additional sub-systems, additional elements, additional structures, and/or additional components, etc.

Unless otherwise defined, all technical and scientific terms used herein have the same meaning as commonly understood by one of ordinary skilled in the art to which the inventive concepts belongs. The system, methods, apparatuses, and/or non-transitory computer readable media examples provided herein are illustrative only and not intended to be limiting.

For the sake of clarity, the first digit of a reference numeral of each component of the example embodiments is indicative of the Figure number, in which the corresponding component is shown. For example, reference numerals starting with digit "1" are shown at least in FIG. 1. Similarly, reference numerals starting with digit "2" are shown at least in FIG. 2, and so on and so forth.

Various example embodiments of the inventive concepts are described below in detail with reference to the accompanying drawings.

Figure 1:
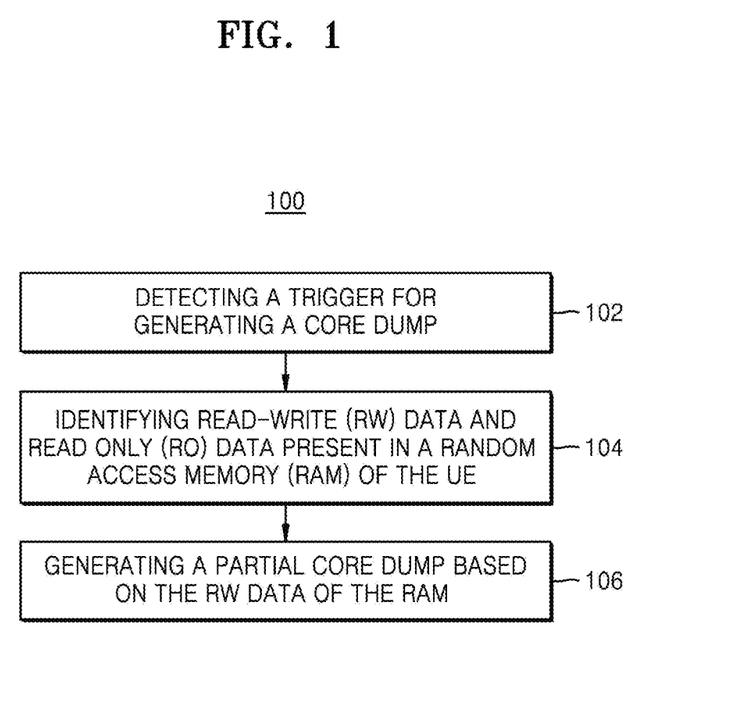
FIG. 1 illustrates an operational flow diagram depicting a method for generating a core dump in a UE, in accordance with at least one example embodiment of the inventive concepts.
Figure 2A:
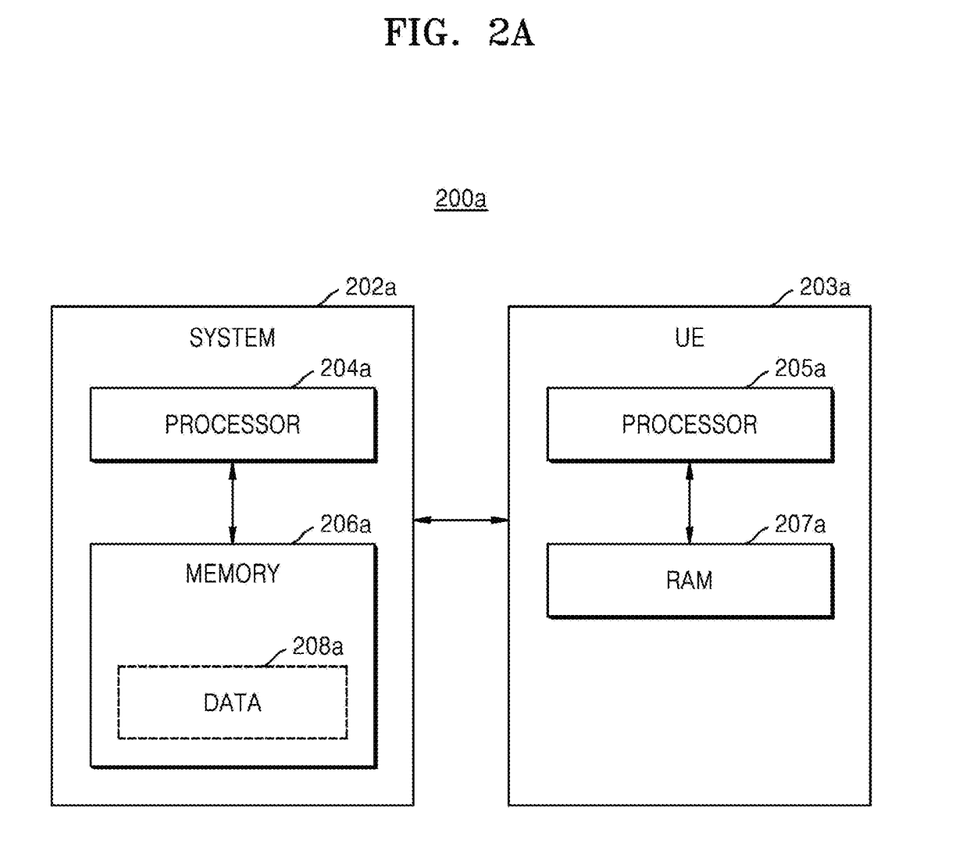
FIG. 2a illustrates a schematic block diagram of a system for generating a core dump in a UE, in accordance with at least one example embodiment of the inventive concepts.

FIG. 1 illustrates an operational flow diagram 100 depicting a method for generating a core dump in a UE, in accordance with at least one example embodiment of the inventive concepts.

At operation 102, the method includes detecting a trigger for generating a core dump, etc. According to at least one example embodiment, the trigger may be an instruction, a fault, an exception, etc., transmitted by and/or generated by a UE (such as UE 203a of FIG. 2a, etc.), but the example embodiments are not limited thereto.

At operation 104, the method includes identifying Read-Write (RW) data and Read Only (RO) data present in a Random-Access Memory (RAM) of the UE, etc.

At operation 106, the method includes generating a partial core dump based on the RW data of the RAM, etc.

Operations 102 to 106 will be discussed in further detail in connection with FIG. 2a.

FIG. 2a illustrates a schematic block diagram 200a of a system 202a for generating a core dump in a UE 203a, in accordance with at least one example embodiment of the inventive concepts. In at least one example embodiment, the system 202a and/or the UE 203a may be implemented in one or more electronic devices, such as a smartphone, a tablet, a laptop, a desktop computer, a workstation computer, a server, a wearable device, a networking device, other smart devices, an Internet of Things (IoT) device, a gaming console, a navigation device, an autonomous device (e.g., autonomous vehicle, etc.), a cloud device, a virtual reality device and/or an augmented reality device, a robotic device, an electronic health care device, etc., but the example embodiments are not limited thereto. In at least one example embodiment, the system 202a may be implemented either in a single device and/or in a distributed manner in a plurality of device, but the example embodiments are not limited thereto. According to at least one example embodiment, the system 202a may be the UE 203a, or may be a separate electronic device connected via a wired interface and/or a wireless interface to the UE 203a, etc.

In at least one example embodiment, the system 202a may include at least one processor 204a, a memory 206a (memory device), and/or data 208a, etc., but the example embodiments are not limited thereto, and for example, the system 202a may include a greater or lesser number of constituent components, such as a plurality of processors 204a, a plurality of memories 206a, a baseband modem processor, a wired network interface, a wireless network interface, a display device, a separate data storage device (e.g., storage space), etc. According to some example embodiments, the data 208a may be stored in the memory 206a, but the example embodiments are not limited thereto. For example, the data 208a may be stored in a separate data storage device, etc. Similarly, the UE 203a may include at least one processor 205a and/or a memory 207a (e.g., memory device), etc., but the example embodiments are not limited thereto.

In at least one example embodiment, the processor 204a and/or 205a may be a single processing unit (e.g., processing circuitry, etc.) or a number of processing units, all of which could include multiple computing units. The processor 204a and/or 205a may be implemented as one or more micropro- cessors, microcomputers, microcontrollers, digital signal processors, central processing units, state machines, logic circuits, and/or any hardware devices that manipulate sig- nals based on operational instructions. For example, the processor 204a and/or 205a (e.g., processing circuitry) may include hardware, such as processors, processor cores, logic circuits, storage devices, etc.; a hardware/software combi- nation such as at least one processor core executing software and/or executing any instruction set, etc.; or a combination thereof. For example, the processing circuitry more specifi- cally may include, but is not limited to, a field programmable gate array (FPGA), a programmable logic unit, an applica- tion-specific integrated circuit (ASIC), s System-on-Chip (SoC), etc. Among other capabilities, the processor 204a and/or 205a are configured to fetch and execute computer- readable instructions and data stored in the memory 206a and/or 207a, respectively, but are not limited thereto.

According to some example embodiments, the at least one processor 204a may be configured to run and/or execute a boot-up procedure stored in the UE 203a. In at least one example embodiment, the boot-up procedure may include generating a checksum based on RO data present and/or stored in RAM 207a of the UE 203a, but the example embodiments are not limited thereto, and for example, the boot-up procedure may be stored in BIOS memory and/or in the ROM of the UE, stored on a network device, stored on a removable disk, etc. Upon generating the checksum, the processor 204a may be configured to store the checksum in the memory 206a. In at least one example embodiment, the checksum may be stored in a reserved area (e.g., a desired area, a target area, etc.) of the RAM in the memory 206a, but the example embodiments are not limited thereto.

According to some example embodiments, the processor 204a may be configured to generate the checksum associ- ated with the RO data by fragmenting the RO data into a number of RO data fragments (e.g., a plurality of RO data fragments). Further, the processor 204a may be configured to generate a number of checksums (e.g., generate a plurality of checksums) related to and/or corresponding to the number of RO data fragments, etc. In at least one example embodi- ment, the processor 204a may be configured to store the number of checksums (e.g., store the plurality of check- sums) into the reserved area of the RAM, but the example embodiments are not limited thereto.

According to at least one example embodiment, the processor 204a may be configured to detect a trigger (e.g., an instruction, a fault, an exception, etc.) related to initiation of a process for generating a core dump as discussed in operation 102 in FIG. 1. In at least one example embodi- ment, the trigger may be detected during the boot-up pro- cedure, during normal execution of the system 202, and/or upon an occurrence of one or more of a hardware error and/or a software error experienced by the UE 203a and/or system 202a, etc., but the example embodiments are not limited thereto. Upon detecting the trigger, the processor 204a may identify and/or classify data present in the RAM 207a and/or other memory and/or data storage devices (e.g., flash memory, SSD, hard drive, etc.) of the UE 203a, etc. In at least one example embodiment, the data stored in the RAM may be identified and/or classified as Read-Write (RW) data and/or Read Only (RO) data, etc., as discussed in operation 104 of FIG. 1.

According to some example embodiments, the processor 204a may be configured to generate a partial core dump based on the RW data of the RAM 207a (and/or other memory) of the UE 203a such that the RW data may be added into the partial core dump as discussed in operation 106 of FIG. 1. According to some example embodiments, only the RW data of the RAM may be added to the partial core dump, but the example embodiments are not limited thereto. For example, the RO and/or RW data added to the partial core dump may be desired data that has been selected, requested, known, and/or identified as storing sensitive data, confidential data, technical data, etc.

In addition to generating the partial core dump, the processor 204a may be configured to derive and/or generate an encryption key. For deriving and/or generating the encryption key, the processor 204a may be configured to generate a random number r (and/or a pseudo-random number, etc.), but the example embodiments are not limited thereto. In at least one example embodiment, the random number r may be referred as private key of the UE. In at least one example embodiment, the private key "r" may be referred as "PrivD". In at least one example embodiment, the processor 204a may be configured to calculate a public key with, for example, an ECC operation as shown below, but the example embodiments are not limited thereto.

$$PubD = PrivD \cdot G$$

where G is the generator point of the elliptic curve.

Further, according to at least one example embodiment, the processor 204a may be configured to derive and/or generate a shared secret value using, for example, the following ECC operation, but the example embodiments are not limited thereto.

$$S = PrivD \cdot PubH$$

In at least one example embodiment, the "Pubh" may be pre-generated and present in the UE, but the example embodiments are not limited thereto.

Additionally, the processor 204a may be configured to feed "S" into, for example, a Key Derivation Function (KDF) to derive and/or generate the symmetric key for an encryption algorithm. In at least one example embodiment, the encryption algorithm may be a symmetric key encryption algorithm as shown below, but the example embodiments are not limited thereto.

$$k = KDF(S)$$

In at least one example embodiment, the processor 204a may be configured to determine a failure of the encryption technique. As one example, the encryption technique may fail due to a system crash before the generation of the symmetric key, etc. As another example, the encryption technique may fail due to the system crash occurring during the ECC operations, etc.

According to at least one example embodiment, upon determining the failure of the encryption technique, the processor 204a may be configured to implement a fallback (e.g., alternate key generation) mechanism. In at least one example embodiment, the processor 204a may be configured to use a KDF based on, for example, the symmetric key encryption algorithm with a salt input to generate a symmetric key (e.g., an alternate symmetric key, etc.) when the system crash occurs prior to the ECC operation or during the ECC operation, as shown below, but the example embodiments are not limited thereto. According to at least one example embodiment, the salt input may be the system time and RO area checksum of the system 202a, but the example embodiments are not limited thereto.

$$\text{Salt} = T \mid ChecksumValue$$

where T=current system time, checksum=RO area checksum calculated at the boot up time. '|' means concatenation.

$$k = KDF(\text{Salt})$$

Furthermore, the processor 204a may be configured to send the salt input along with the core dump, such that a symmetric key may be generated for decryption, etc.

According to some example embodiments, upon detecting the trigger (e.g., an instruction, a fault, an exception, etc.) and generating the encryption key, the processor 204a may be configured to perform a validation operation on the number of checksums (e.g., the plurality of checksums). In at least one example embodiment, the validation operation may include comparing the number of checksums with the number of checksums stored in the reserved area of the RAM in the memory 206a (e.g., compare the plurality of checksums with the plurality of checksums which were previously generated and stored in the reserved area of the RAM, for example, after a boot-up operation of the UE, etc.), but is not limited thereto. In at least one example embodiment, the processor 204a may be configured to perform the comparison based on a value of each checksum among the number of checksums, such that the value is compared with another value related to each of the number of checksums stored previously in the RAM in the memory 206a, etc. Upon comparison, the processor 204a may be configured to identify one or more checksums among the number of checksums failing the validation operation (e.g., identifying and/or determining whether the checksums are valid or invalid).

According to some example embodiments, upon identifying the one or more checksums failing the validation, the processor 204a may be configured to encrypt one or more RO data fragments related to the one or more checksums to the partial core dump. In at least one example embodiment, the processor 204a may be configured to encrypt the one or more RO fragments by applying a desired and/or predefined cryptographic technique. In at least one example embodiment, the desired and/or predefined encryption technique may be the symmetric key encryption algorithm, but the example embodiments are not limited thereto.

Furthermore, the key "k" may be used to encrypt sensitive portions of the dump. In at least one example embodiment, the sensitive areas may include the one or more RO data fragments with the symmetric key encryption algorithm. In at least one example embodiment, the processor 204a may be configured to send the public key "PubD" along with an encrypted core dump upon encryption, but the example embodiments are not limited thereto.

Upon encrypting one or more RO data fragments, the processor 204a may be configured to append the one or more encrypted RO data fragments to the partial core dump. In at least one example embodiment, the one or more RO data fragments may be interchangeably be referred as one or more encrypted sections, etc. In at least one example embodiment, the processor 204a may be configured to append the one or more encrypted RO data fragments in a random order, but is not limited thereto. Additionally, by encrypting the RO data fragments using the above encryption methods may decrease and/or reduce the ability of malicious actors to access sensitive data, confidential data, technical data, etc., of the UE potentially available in a core dump.

The memory 206a may include any non-transitory computer-readable medium known in the art including, for example, volatile memory, such as static Random-Access memory (SRAM) and/or dynamic Random-Access memory (DRAM), and/or non-volatile memory, such as read-only memory (ROM), erasable programmable ROM, flash memories, hard disks, optical disks, and/or magnetic tapes, etc.

The data 208a serves, among other things, as a repository for storing data processed, received, and/or generated by one or more of the processor 204a, and/or the memory 206a. Writing further, in a non-limiting manner, one or more of the aforementioned components of the system 202a may send and/or receive data, for example, using one or more input/output ports, one or more buses, and one or more communication units (e.g., communication processors, network interfaces, etc.), etc., but the example embodiments are not limited thereto.

Figure 2B:
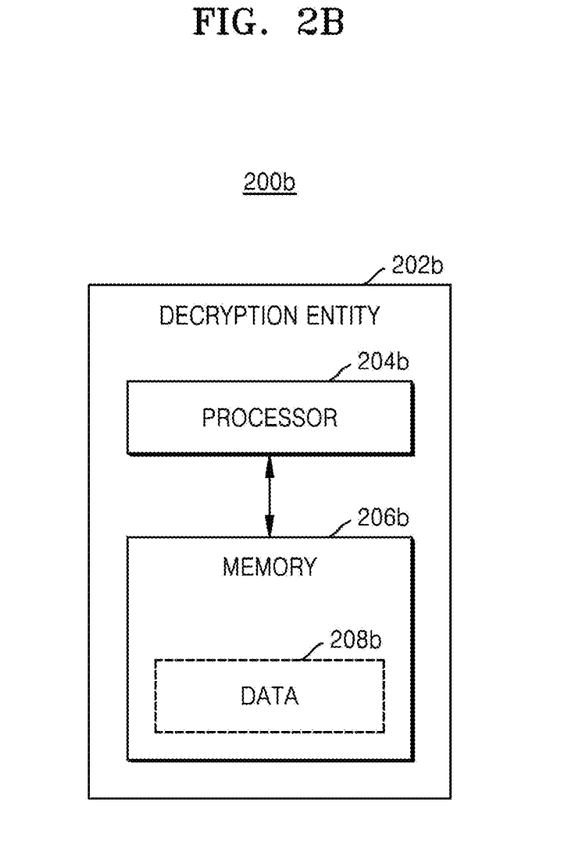
FIG. 2b illustrates a schematic block diagram of a decryption entity to decrypt encrypted sections, in accordance with at least one example embodiment of the presents subject matter.

FIG. 2b illustrates a schematic block diagram of a decryption entity 202b (e.g., decryption device, etc.) to decrypt the encrypted sections, in accordance with at least one example embodiment of the inventive concepts. According to some example embodiments, the decryption entity 202b may include at least one processor 204b, a memory 206b and/or a data 208, etc., but the example embodiments are not limited thereto, and for example, may include a greater or lesser number of constituent components. In at least one example embodiment, the processor 204b may be a single processing unit (e.g., processing circuitry, etc.) or a number of processing units, all of which could include multiple computing units. The processor 204b may be implemented as one or more microprocessors, microcomputers, microcontrollers, digital signal processors, central processing units, state machines, logic circuits, and/or any hardware devices that manipulate signals based on operational instructions. For example, the processor 204b (e.g., processing circuitry) may include hardware, such as processors, processor cores, logic circuits, storage devices, etc.; a hardware/software combination such as at least one processor core executing software and/or executing any instruction set, etc.; or a combination thereof. For example, the processing circuitry more specifically may include, but is not limited to, a field programmable gate array (FPGA), a programmable logic unit, an application-specific integrated circuit (ASIC), s System-on-Chip (SoC), etc. Among other capabilities, the processor 204b is configured to fetch and execute computer-readable instructions and data stored in the memory 206b, etc., but is not limited thereto.

In at least one example embodiment, the processor 204b may be configured to identify one or more encrypted sections from a number of data sections (e.g., data fragments, memory sections, etc.). In at least one example embodiment, the one or more encrypted sections may include at least one of a RO data fragment and an RW data fragment, but the example embodiments are not limited thereto.

In at least one example embodiment, the processor 204b may further be configured to receive a trigger (e.g., an instruction, a fault, an exception, etc.) from a UE device, such as UE 203a of FIG. 2a, etc., to generate a core dump. In at least one example embodiment, for generating the core dump, the processor 204b may be configured to read the reserved area in the partial core dump to fetch information related to a number of sections of the partial core dump. In at least one example embodiment, the processor 204b may be further configured to fetch the public key "Pubd" present in (and/or included in, stored in, etc.) the partial core dump, but the example embodiments are not limited thereto.

According to some example embodiments, the processor 204b may be configured to fetch the RO data from at least one desired and/or predetermined file. In at least one example embodiment, the desired and/or predetermined file may be an executable linkable format (ELF) file, but is not limited thereto. Further, the processor 204b may be configured to write the RO data to at least one output file, etc. In at least one example embodiment, the processor 204b may be configured to fetch the RW data from the partial core dump and write the RW data to the output file to create the complete core dump, etc.

Additionally, the processor 204b may be configured to decrypt the one or more encrypted sections of the partial core dump, but is not limited thereto. In at least one example embodiment, the one or more encrypted sections may include one or more corrupted RO data fragments, but is not limited thereto. In at least one example embodiment, the processor 204b may be configured to obtain ordering information corresponding to an order of the RO data (e.g., the order that the RO data was appended to the partial core dump, etc.), from a desired and/or predetermined location in the partial core dump. Further, the processor 204b may be configured to re-order the one or more corrupted RO data fragments based on the re-ordering information (e.g., change the ordering of the one or more corrupted RO data fragments back to their original order, etc.). Furthermore, the processor 204b may be configured to decrypt the one or more encrypted corrupted RO data fragments, etc.

In at least one example embodiment, the processor 204b for decrypting may be configured to obtain the public key of the UE from the desired and/or predetermined location.

Further, the processor 204b may be configured to generate the shared key based on the obtained public key of the UE and a private key of the decryption entity 202b (e.g., a private key stored in the decryption entity 202b, etc.). Additionally, the processor 204b may be configured to generate the symmetric key based on shared key using, for example, KDF, but the example embodiments are not limited thereto. In response to the generation of the symmetric key, the processor 204b may be configured to decrypt the at least partially encrypted partial core dump based on the generated symmetric key and the decryption algorithm, etc.

The memory 206b may include any non-transitory computer-readable medium known in the art including, for example, volatile memory, such as static Random-Access memory (SRAM) and/or dynamic Random-Access memory (DRAM), etc., and/or non-volatile memory, such as read-only memory (ROM), erasable programmable ROM, flash memories, hard disks, optical disks, and/or magnetic tapes, etc., but the example embodiments are not limited thereto.

The data 208b serves, among other things, as a repository for storing data processed, received, and/or generated by one or more of the processor 204b, and/or the memory 206b, etc. Writing further, in a non-limiting manner, one or more of the aforementioned components of the decryption 202b may send and/or receive data, for example, using one or more input/output ports, one or more buses, and/or one or more communication units (e.g., communication processors, network interfaces, etc.), etc., but the example embodiments are not limited thereto.

Figure 3A:
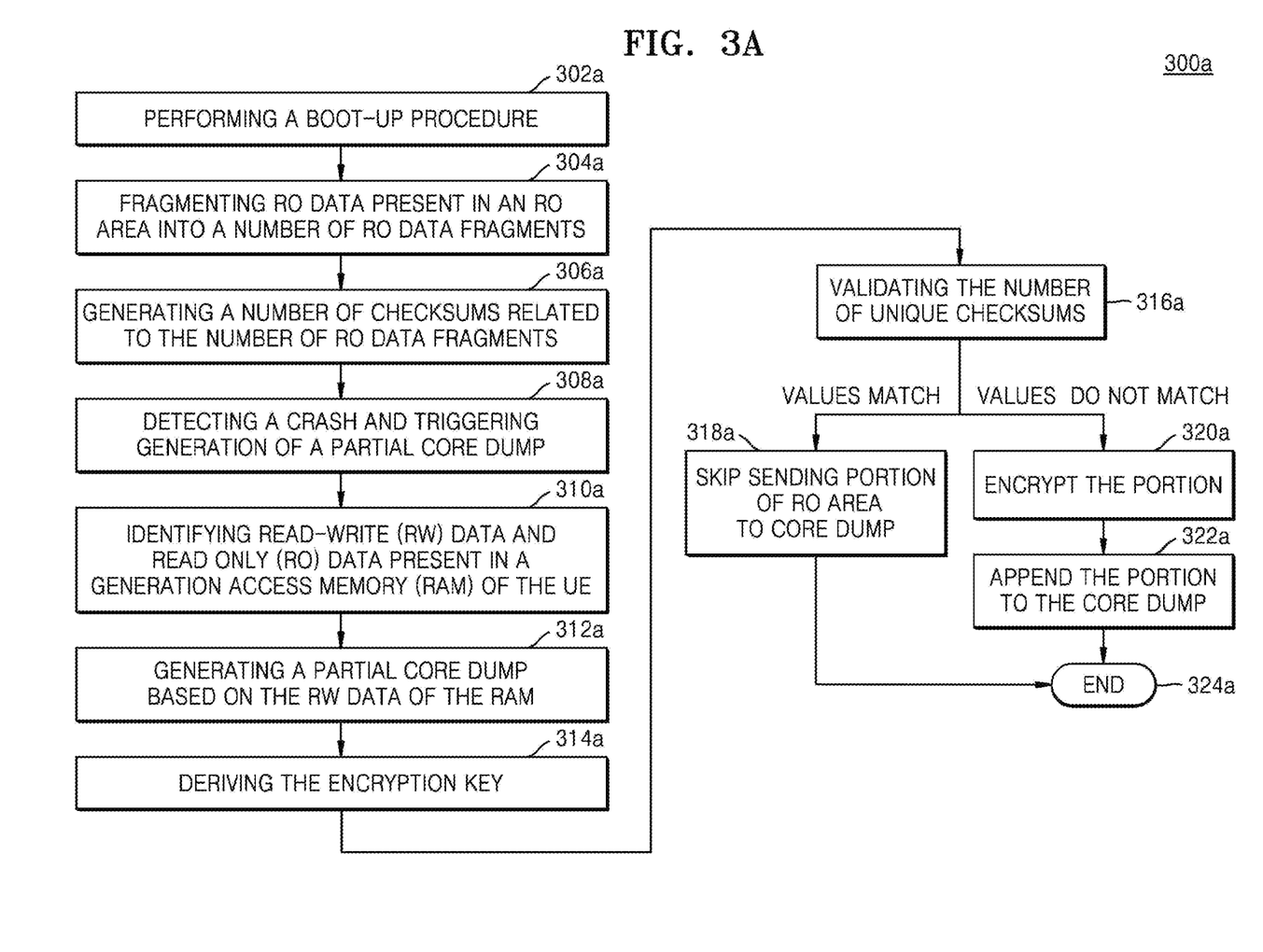
FIG. 3a illustrates an operational flow diagram depicting a process for generating a core dump, in accordance with at least one example embodiment of the inventive concepts.

FIG. 3a illustrates an operational flow diagram 300a depicting a process for generating a core dump, in accordance with at least one example embodiment of the inventive concepts. In at least one example embodiment, the core dump may be generated by the system 202a as discussed in FIGS. 2a and 2b. In at least one example embodiment, the system 202a may be incorporated in a UE, but the example embodiments are not limited thereto. Examples of the UE may include, but are not limited to, a smart phone, a Personal Computer (PC), a laptop, a tablet, a wearable device, a server, a networking device, other smart devices, an Internet of Things (IoT) device, a gaming console, a navigation device, an autonomous device (e.g., autonomous vehicle, etc.), a cloud device, a virtual reality device and/or an augmented reality device, a robotic device, an electronic health care device, etc., but the example embodiments are not limited thereto.

At operation 302a, the system 202a may perform a boot up procedure for the UE.

At operation 304a, the system 202a may fragment RO data present in an RO area into a number of RO data fragments (e.g., a plurality of RO data fragments). Upon generation of the number of RO fragments (e.g., the plurality of RO data fragments), the system 202a may proceed to operation 306a.

At operation 306a, the system 202a may generate a number of checksums related to the number of RO data fragments. In at least one example embodiment, each checksum may be a cycle redundancy check (CRC) value calculated for each RO data fragment, but the example embodiments are not limited thereto, and for example, other hashing techniques may be used. In at least one example embodiment, the number of checksums may be stored in a storage space (e.g., storage device), such as the memory 206, a non-transitory computer readable media, etc.

At operation 308a, the system 202a may detect a crash and triggering (e.g., initiating, instructing, causing, etc.) generation of a partial core dump. Examples of the crash may include, but are not limited to, a modem crash, software system errors, hardware system errors, and/or a data theft attempt, etc., but are not limited thereto.

At operation 310a, the system 202a may identify data present in the RAM (and/or other memory) of the UE. In at least one example embodiment, the data may be identified as Read-Write (RW) data and/or Read Only (RO) data, etc. In at least one example embodiment, the RO data may include information present in Executable and Linkable Format (ELF), but is not limited thereto. In at least one example embodiment, the information may include code (e.g., program code, software code, etc.), strings, and/or hardcoded/pre stored information in binary format, etc., but the example embodiments are not limited thereto.

At operation 312a, the system 202a may generate the partial core dump based on the RW data such that the RO data is not added in the partial core dump.

At operation 314a, system 202a may derive an encryption key associated with the partial core dump, the encryption key in extension associated with the number of checksums and the number of RO data fragments (e.g., plurality of checksums and plurality of RO data fragments), etc. In at least one example embodiment, generating the encryption key may include generating a random number (and/or pseudo random number) r. In at least one example embodiment, the random number r may be referred as private key of the UE. In at least one example embodiment, the private key "r" may be referred as "PrivD". Further, the system 202a may calculate a public key, e.g., with an ECC operation:

$$PubD = PrivD \cdot G$$

where G is the generator point of the elliptic curve.

Further, the system 202a may derive a shared secret value with, e.g., the ECC operation:

$$S = PrivD \cdot PubH$$

Additionally, the system 202a may feed "S" into a key derivation function (KDF) to derive the symmetric key for an encryption algorithm. In at least one example embodiment, the algorithm may be a symmetric key encryption algorithm, but the example embodiments are not limited thereto.

$$k = KDF(S)$$

In at least one example embodiment, where it is determined that encryption technique is unsuccessful, for example, due to a system crash occurring prior to a ECC operation and/or during the ECC operation causing a failure of the encryption technique, etc., the system 202a may use a KDF based on the symmetric key encryption algorithm with a salt input (e.g., system time and/or RO area checksum) to generate a symmetric key.

$$Salt = T \,|\, Checksum$$

where T=current system time, checksum=RO area checksum calculated at the boot up time. '|' means concatenation.

$$k = KDF(Salt)$$

Furthermore, the system 202a may send the salt input along with the core dump such that a symmetric key may be generated for decryption.

At operation 316a, the system 202a may validate the number of checksums associated with the number of RO data fragments in response to onset of the core dump generation. In at least one example embodiment, the validation may include comparing the number of checksums (e.g., the current checksums) with number of other checksums previously stored in the reserved area of the RAM (e.g., previous checksums, checksums generated during a boot-up operation of the UE, such as the checksums generated during operation 306a, checksums generated during known normal operation of the UE, etc.) in the memory 206. In at least one example embodiment, the system 202a may perform the comparison based on a value of each checksum among the number of checksums (e.g., plurality of checksums) such that the value is compared with another value related to each of the number of other checksums stored previously in the RAM in the memory 206.

In at least one example embodiment, where it is determined that the value associated with each of the number of checksums may be the same and/or similar to the other value associated with the number of other checksums, the system 202a may proceed to operation 318a.

In at least one example embodiment, where it is determined that the value associated with each of the number of checksums is different than the other value associated with the number of other checksums, the system 202a may proceed to operation 320a.

At operation 318a, the system 202a may skip sending portion of the RO area to the partial core dump.

At operation 320a, the system 202a may encrypt the partial core dump. In at least one example embodiment, encryption includes generating a random private key of the UE using a cryptographic key exchange technique, but is not limited thereto. In at least one example embodiment, the system 202a may generate a public key of the UE based on the generated random private key and asymmetric cipher algorithms, but the example embodiments are not limited thereto. In at least one example embodiment, following the generation of the public key, the system 202a may generate a shared key derived from the random private key of the UE and the public key of the decryption entity. Further, the system 202a may generate a symmetric key based on the random private key of the UE and the public key of the decryption entity 202b by the system 202a, but the example embodiments are not limited thereto.

Further, the system 202a may encrypt at least one partial portion of the RW data using the symmetric key to obtain the at least one partially encrypted partial core dump. Moreover, the system 202a may append the public key of the UE at a desired and/or predetermined location in the at least partially encrypted partial core dump, but the example embodiments are not limited thereto. In at least one example embodiment, the system 202a may generate an alternate symmetric key upon determining a failure during the encrypting of the at least partial portion of the RW data using the symmetric key, etc. Additionally, upon generation of the alternate symmetric key, the system 202a may generate a symmetric key by using the KDF based on asymmetric key encryption algorithm with a system time (e.g., the current system time) and a RO area checksum, but the example embodiments are not limited thereto.

In at least one example embodiment, the system 202a may check whether one or more security criteria (e.g., security settings, parameters, etc.) are set in the UE. In at least one example embodiment, the one or more criteria may include active remote access tool (RAT) information for selectively encrypting the at least one portion of the RW data associated with an active RAT, information received from one or more internal security modules, such as a fake base station detection module (e.g., fake base station detection code, etc.), a stack corruption detection module (e.g., stack corruption detection code, etc.), and/or a buffer overflow detection module (e.g., buffer overflow detection code, etc.), etc., to determine the at least one portion of the RW to be encrypted based on a higher risk assessment, application processor (AP), and/or a co-processor indicating a size of the at least one portion of the RW data to be encrypted, and/or a fixed range of memory addresses specified to be encrypted, etc. Further, the system 202a may encrypt at least a portion of the RW data in the partial core dump upon ascertaining that the one or more criteria are set in the UE, to obtain at least partially encrypted partial core dump.

At operation 322a, the system 202a may append the number of RO data fragments to the partial core dump upon the encryption when each of the number of checksums is different than the other value associated with the number of other checksums, etc. In at least one example embodiment, the number of checksums with the value different than the other value may be referred as one or more RO data fragments, but is not limited thereto. In at least one example embodiment, the one or more RO data fragments may be appended to the partial core dump in a random order.

At operation 324a, the process may terminate.

Figure 3B:
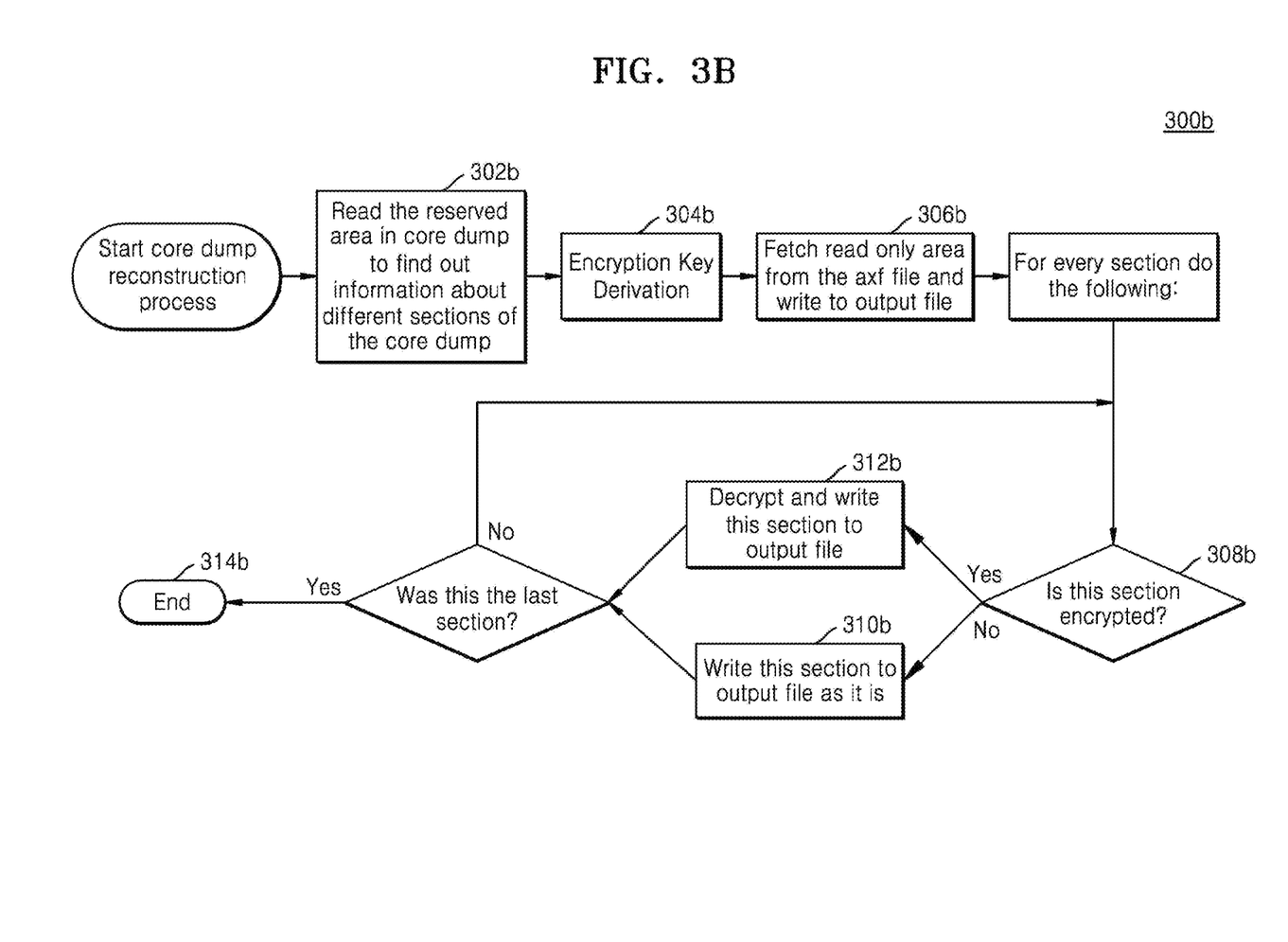
FIG. 3b illustrates an operational flow diagram depicting a process for reconstructing a complete core dump, in accordance with at least one example embodiment of the inventive concepts.

FIG. 3b illustrates an operational flow diagram 300b depicting a process for reconstructing a complete core dump, in accordance with at least one example embodiment of the inventive concepts. In at least one example embodiment, the complete core dump is generated upon receiving the partial core dump generated in the FIG. 3a, but the example embodiments are not limited thereto. In at least one example embodiment, the core dump may be generated in response to receiving a trigger (e.g., instruction, signal, etc.) to generate the core dump.

At operation 302b, the decryption entity 202b may read a reserved area in the partial core dump to fetch information related to a number of sections (e.g., plurality of sections) of the partial core dump.

At operation 304b, the decryption entity 202b may fetch a public key present (e.g., included, appended, etc.) in the partial core dump. In at least one example embodiment, the public key may be the "PubD" a referred in the FIG. 2, but is not limited thereto. In at least one example embodiment, the decryption entity 202b may use the "PubD" to derive a symmetric key for decryption. In at least one example embodiment, the decryption entity 202b may use the following formula to derive the symmetric key:

$$S = PubD \cdot PrivH$$

k=KDF(S) wherein k=k generated in FIG. 3a.

the encryption key present in partial core dump is the key "k" generated in the FIG. 3a and sent along with the partial core dump for decryption, but the example embodiments are not limited thereto.

At operation 306b, the decryption entity 202b may fetch the RO data from a desired and/or predetermined file. In at least one example embodiment, the desired and/or predetermined file may be one or more of an ARM executable file (AXF) file and/or a file in an ELF format, etc., but the example embodiments are not limited thereto. Further, the decryption entity 202b may write the RO data to an output file. In at least one example embodiment, the decryption entity 202b may fetch the RW data from the partial core dump. Upon fetching the RW data from the partial core dump, the decryption entity 202b may write the RW data to the output file to reconstruct the complete core dump.

At operation 308b, the decryption entity 202b may determine whether each of the number of sections of the partial core dump is encrypted or not. In at least one example embodiment, where it is determined that a section amongst the number of sections is encrypted, the decryption entity 202b may proceed to operation 312b. In at least one example embodiment, where it is determined that a section amongst the number of sections is not encrypted, the decryption entity 202b may proceed to operation 310b.

At operation 310b, the decryption entity 202b may write the section identified as an unencrypted section to the output file.

At operation 312b, the decryption entity 202b may decrypt one or more sections among the number of sections (e.g., plurality of sections) identified and/or determined as one or more encrypted sections. In at least one example embodiment, the one or more encrypted sections may include one or more of an RO data fragment and/or an RW data fragment from the portion of the RW data encrypted based on the one or more criteria. In at least one example embodiment, the one or more encrypted sections may include one or more corrupted RO data fragments. In at least one example embodiment, the decryption entity 202b may obtain ordering information corresponding to an order of the RO data, from a desired and/or predetermined location in the partial core dump.

Further, the decryption entity 202b may re-order the one or more corrupted RO data fragments based on the re-ordering information. Furthermore, the decryption entity 202b may decrypt the one or more corrupted RO data fragments. In at least one example embodiment, decryption may be performed by the decryption entity 204b as referred in the FIG. 2b, but the example embodiments are not limited thereto. In at least one example embodiment, the decryption may include obtaining the public key of the UE from the desired and/or predetermined location, etc. Upon obtaining the shared key, the decryption entity 202b may generate the shared key based on the obtained public key of the UE and a private key of (e.g., stored in) the decryption entity. Additionally, decryption entity 202b may generate the symmetric key based on the shared key using KDF, but is not limited thereto. Moving forward, the decryption entity 202b may decrypt the at least partially encrypted partial core dump based on the generated symmetric key and the decryption algorithm, but the example embodiments are not limited thereto.

Furthermore, the decryption entity 202b may write the decrypted partial core dump to the output file.

Figure 4:
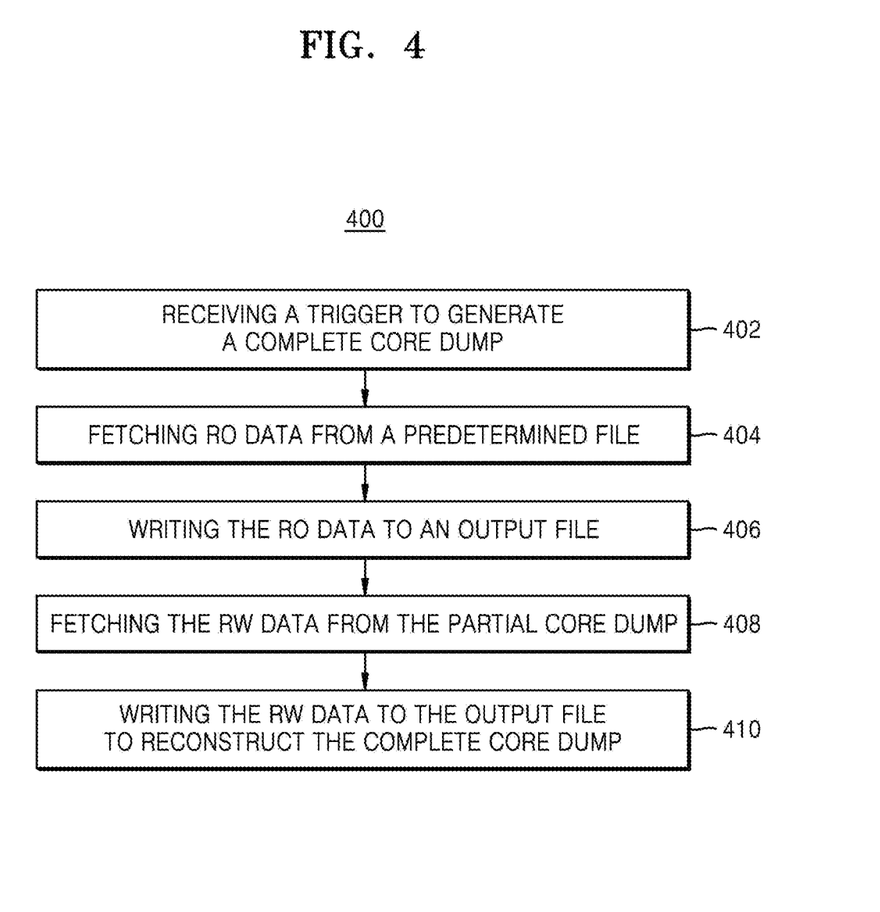
FIG. 4 illustrates an operational flow diagram depicting a method for reconstructing a complete core dump, in accordance with at least one example embodiment of the inventive concepts.

FIG. 4 illustrates an operational flow diagram 400 depicting a method for reconstructing a complete core dump, in accordance with at least one example embodiment of the inventive concepts.

At operation 402, the method includes, receiving a trigger (e.g., instruction, signal, etc.) to generate a complete core dump.

At operation 404, the method includes fetching RO data from a desired and/or predetermined file.

At operation 406, the method includes writing the RO data to an output file.

At operation 408, the method includes fetching the RW data from the partial core dump.

At operation 410, the method includes writing the RW data to the output file to reconstruct the complete core dump.

Figure 5:
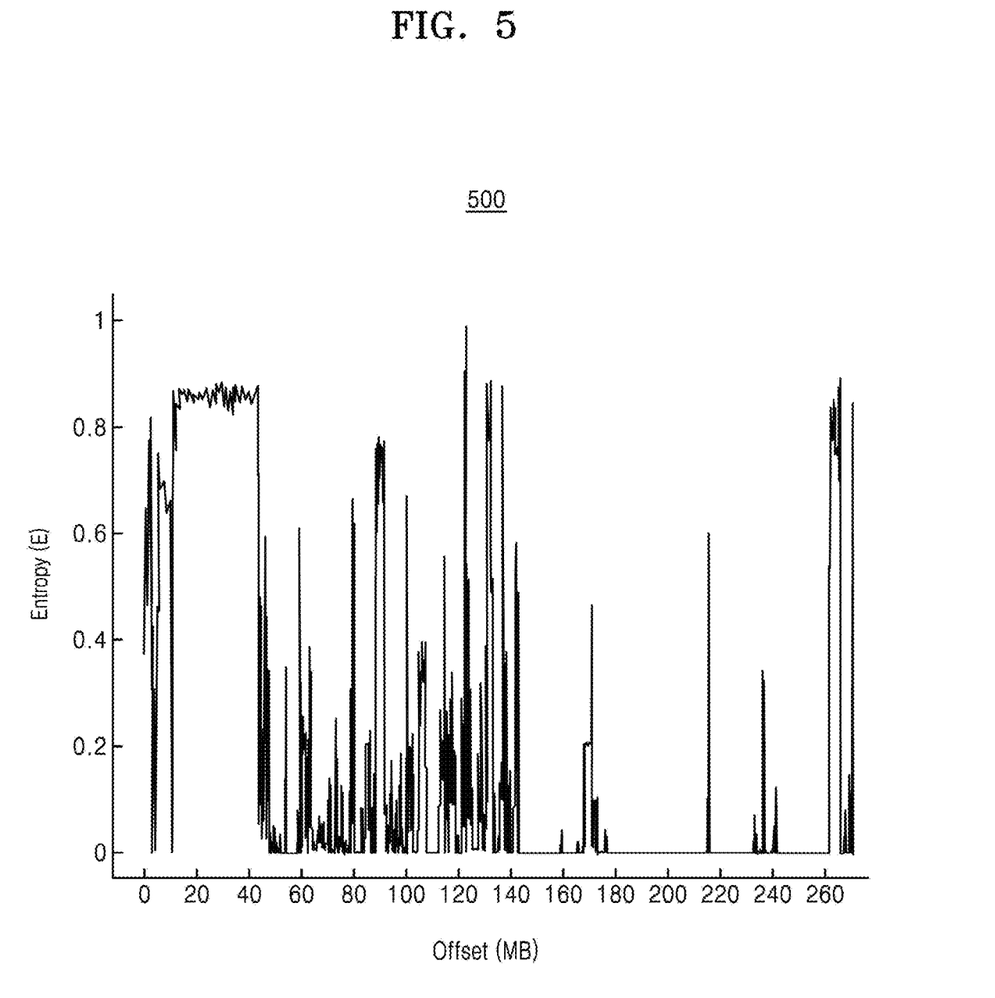
FIG. 5 illustrates a graphical representation depicting an entropy for a normal core dump, in accordance with at least one example embodiment of the inventive concepts.

FIG. 5 illustrates a graphical representation 500 depicting an entropy for a normal core dump, in accordance with at least one example embodiment of the inventive concepts. In at least one example embodiment, the entropy for encrypted data is higher (e.g., ~=1) than for the usual data present in the RAM core dump. In at least one example embodiment, the entropy in the graphical representation 400 is e.g., ~=0.85 from offset, e.g., ~10 MB to ~40 MB, etc., representing an assembly instruction, but the example embodiments are not limited thereto.

Figure 6:
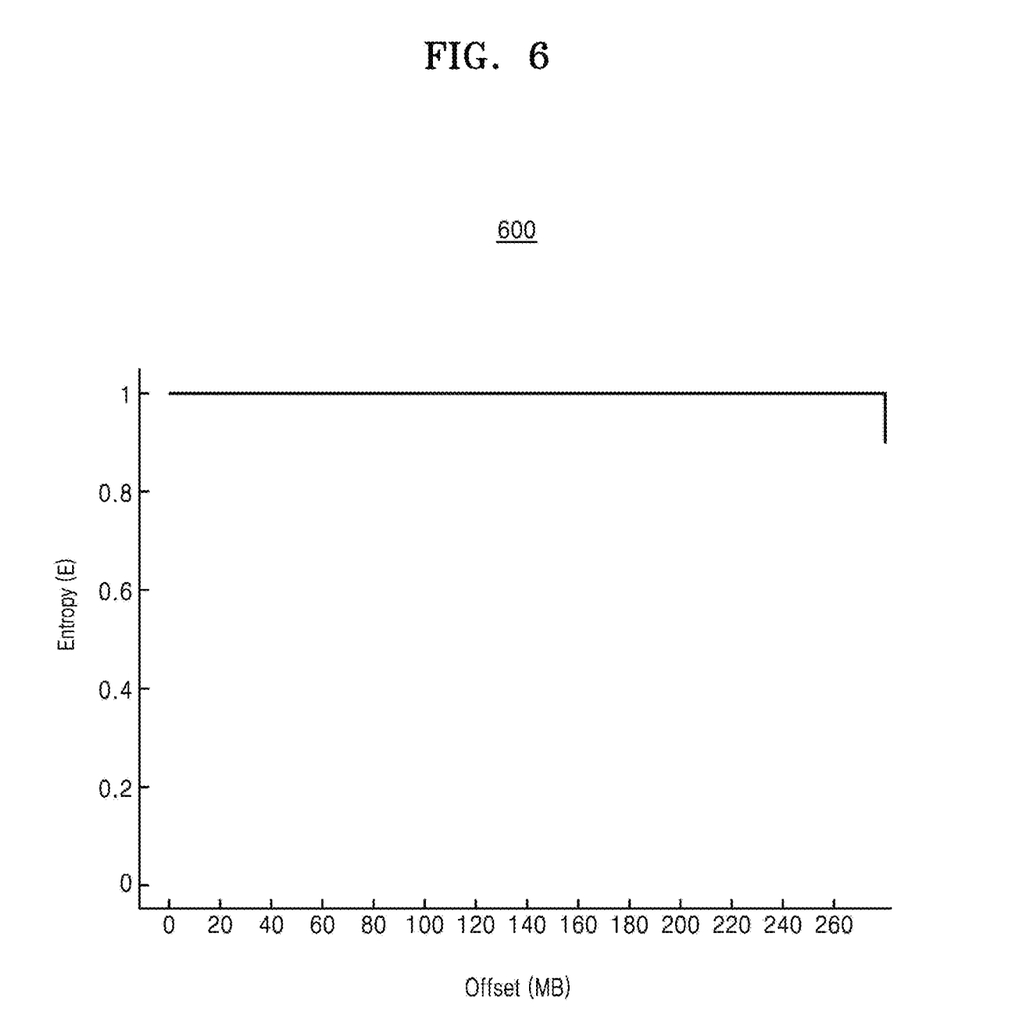
FIG. 6 illustrates a graphical representation depicting an entropy fully encrypted core dump, in accordance with at least one example embodiment of the inventive concepts.

FIG. 6 illustrates a graphical representation 600 depicting an entropy fully encrypted core dump, in accordance with at least one example embodiment of the inventive concepts. In at least one example embodiment, the entropy of a fully encrypted RAM dump is e.g., ~=1. Further, the encrypted portions of RAM dump may also include entropy e.g., ~=1. In at least one example embodiment, e.g., entropy=1 may detect an infringement by detecting presence of encrypted code area/other areas, but the example embodiments are not limited thereto.

While specific language has been used to describe the various example embodiments of the inventive concepts, any limitations arising on account thereto, are not intended. As would be apparent to a person in the art, various working modifications may be made to the method in order to implement the inventive concepts as taught herein. The drawings and the foregoing description discuss various example embodiments of the inventive concepts. Those skilled in the art will appreciate that the described elements may well be combined into a single functional element. Alternatively, certain elements may be split into multiple functional elements. For example, elements from one example embodiment may be added to another example embodiment, etc. Clearly, the various example embodiments of the inventive concepts may be otherwise variously embodied, and practiced within the scope of the following claims.

We claim:

1. A method of generating a core dump in a User Equipment (UE), the method comprising:
    detecting, using at least one processor, a trigger, the trigger including an instruction to generate a core dump in the UE;
    classifying, using the at least one processor, data stored in memory of the UE as Read-Write (RW) data or Read Only (RO) data; and
    generating, using the at least one processor, a partial core dump based on the RW data of the memory;
    fragmenting, using the at least one processor, the RO data into a plurality of RO data fragments; and
    generating, using the at least one processor, a plurality of checksums based on the plurality of RO data fragments; and
    storing, using the at least one processor, the plurality of checksums in a storage device.

2. The method as claimed in claim 1, further comprising:
    validating, using the at least one processor, each checksum of the generated plurality of checksums based on a plurality of previous checksums stored in the storage device in response to onset of the core dump generation; and
    appending, using the at least one processor, one or more RO data fragments corresponding to checksums which fail the validation to the partial core dump.

3. The method as claimed in claim 1, further comprising:
    appending, using the at least one processor, the one or more RO data fragments to the partial core dump in a random order.

4. The method as claimed in claim 1, further comprising:
    encrypting, using the at least one processor, the one or more RO data fragments using a desired cryptographic technique.

5. The method as claimed in claim 4, further comprising:
    appending, using the at least one processor, the encrypted one or more RO data fragments to the partial core dump in a random order.

6. The method as claimed in claim 1, further comprising:
    determining, using the at least one processor, whether one or more security criteria are set in the UE; and
    encrypting, using the at least one processor, at least one partial portion of the RW data in the partial core dump based on results of the determining to obtain at least one partially encrypted partial core dump.

7. The method as claimed in claim 6, wherein the one or more criteria comprise at least one of:
    active remote access tool (RAT) information for selectively encrypting the at least one portion of the RW data associated with an active RAT;
    information received from one or more internal security modules to determine the at least one portion of the RW to be encrypted based on a higher risk assessment, the one or more internal security modules including at least one of a fake base station detection module, a stack corruption detection module, and a buffer overflow detection module;
    information received from one or more external devices indicating a size of the at least one portion of the RW data to be encrypted, the one or more external devices including at least one of an application processor (AP), and a co-processor;
    a fixed range of memory addresses specified to be encrypted; or
    any combinations thereof.

8. The method as claimed in claim 6, further comprising:
    generating, using the at least one processor, a random private key of the UE for use in a cryptographic key exchange technique;
    generating, using the at least one processor, a public key of the UE based on the generated random private key and at least one asymmetric cipher algorithm;
    generating, using the at least one processor, a shared key based on the random private key of the UE and a public key of a decryption device;
    generating, using the at least one processor, a symmetric key based on the shared key using a desired Key Derivation Function (KDF);

encrypting, using the at least one processor, the at least one partial portion of the RW data using the symmetric key and a desired encryption algorithm to obtain the at least one partially encrypted partial core dump; and appending, using the at least one processor, the public key of the UE at a desired location in the at least one partially encrypted partial core dump.

9. The method as claimed in claim 8, further comprising:

determining, using the at least one processor, whether a failure occurred during the encrypting the at least partial portion of the RW data using the symmetric key; and generating, using the at least one processor, an alternate symmetric key using the KDF, a current system time and a RO area checksum, based on results of the determining.

10. The method as claimed in claim 9, wherein the alternate symmetric key is generated in response to a system crash prior to an error correction code (ECC) operation.

11. The method as claimed in claim 9, wherein the alternate symmetric key is generated in response to a system crash during an ECC operation.

12. A method of reconstructing a complete core dump, the method comprising:

receiving, using at least one processor, a trigger, the trigger including an instruction to generate a complete core dump of a user equipment (UE);

fetching, using the at least one processor, read-only (RO) data from a desired partial core dump file, the desired partial core dump file being at least partially encrypted;

writing, using the at least one processor, the RO data to an output file;

fetching, using the at least one processor, read-write (RW) data from the desired partial core dump file; and writing, using the at least one processor, the RW data to the output file to reconstruct the complete core dump.

13. The method as claimed in claim 12, further comprising:

identifying, using the at least one processor, one or more encrypted sections included in the desired partial core dump file, wherein the one or more encrypted sections comprises at least one of: an RO data fragment, and an encrypted RW data fragment;

decrypting, using the at least one processor, the identified one or more encrypted sections; and writing, using the at least one processor, the one or more decrypted sections to the output file.

14. The method as claimed in claim 13, wherein the one or more encrypted sections further comprises one or more corrupted RO data fragments, and the method further comprises:

obtaining, using the at least one processor, ordering information from a desired location in the desired partial core dump file, the ordering information corresponding to an original order of the RO data;

re-ordering, using the at least one processor, the one or more corrupted RO data fragments based on the ordering information; and decrypting, using the at least one processor, the one or more corrupted RO data fragments based on the re-ordering.

15. The method as claimed in claim 14, further comprising:

obtaining, using the at least one processor, a public key associated with a user equipment (UE) from the desired location in the desired partial core dump file;

generating, using the at least one processor, a shared key based on the obtained public key and a private key stored on decryption device;

generating, using the at least one processor, a symmetric key based on the shared key using a desired key derivation function (KDF); and decrypting, using the at least one processor, the at least partially encrypted partial core dump file based on the generated symmetric key and a desired decryption algorithm.

16. A system for generating core dump in a User Equipment (UE), the system comprising:

at least one processor configured to execute computer readable instructions to:

detect a trigger, the trigger including an instruction to generate a core dump in the UE;

classify data stored in memory of the UE as Read-Write (RW) data and Read Only (RO) data present in the memory of the UE;

generate a partial core dump based on the RW data of the memory of the UE;

fragment the RO data into a plurality of RO data fragments; and generate a plurality of checksums correspond to the plurality of RO data fragments; and store the plurality of checksums in a storage device.

17. The system as claimed in claim 16, wherein the at least one processor is further configured to execute computer readable instructions to:

validate each checksum of the generated plurality of checksums based on a plurality of previous checksums stored in the storage device in response to onset of the core dump generation; and append one or more RO data fragments corresponding to checksums which fail the validation to the partial core dump.

18. The system as claimed in claim 16, wherein the at least one processor is further configured to execute computer readable instructions to:

append the one or more RO data fragments to the partial core dump in a random order.

19. The system as claimed in claim 16, wherein the at least one processor is further configured to execute computer readable instructions to:

encrypt the one or more RO data fragments using a desired cryptographic technique.

20. The system as claimed in claim 19, wherein the at least one processor is further configured to execute computer readable instructions to:

append the encrypted one or more RO data fragments to the partial core dump in a random order.

* * * * *